(12) United States Patent
Wang et al.

(10) Patent No.: US 11,174,800 B2
(45) Date of Patent: Nov. 16, 2021

(54) TRANSIENT CONTROLLER AND METHOD OF OPERATING GAS ENGINE

(71) Applicant: Caterpillar Inc., Peoria, IL (US)

(72) Inventors: Paul Wang, Peoria, IL (US); Robert J. Maxson, Lafeyette, IN (US); David M. Ginter, Peoria, IL (US); Michael Bardell, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 48 days.

(21) Appl. No.: 16/580,850

(22) Filed: Sep. 24, 2019

(65) Prior Publication Data

US 2021/0087981 A1    Mar. 25, 2021

(51) Int. Cl.
*F02D 19/06* (2006.01)
*F02D 41/00* (2006.01)

(52) U.S. Cl.
CPC ..... *F02D 19/0615* (2013.01); *F02D 19/0644* (2013.01); *F02D 41/0007* (2013.01); *F02D 41/0025* (2013.01)

(58) Field of Classification Search
CPC ............. F02D 41/0025; F02D 41/0007; F02D 19/0644; F02D 19/0615
See application file for complete search history.

(56) References Cited

U.S. PATENT DOCUMENTS

| 5,139,002 A | * | 8/1992 | Lynch | ..................... F02B 43/10 123/575 |
| 5,787,864 A | | 8/1998 | Collier, Jr. et al. | |
| 2009/0071452 A1 | * | 3/2009 | Phlips | ................. F02D 19/0644 123/575 |

FOREIGN PATENT DOCUMENTS

| CN | 101333961 A | | 12/2008 |
| JP | 2016130473 A | * | 7/2016 |

\* cited by examiner

*Primary Examiner* — Kevin A Lathers
(74) *Attorney, Agent, or Firm* — Leydig, Voit & Mayer, Ltd.

(57) ABSTRACT

A controller for an internal combustion engine of a generator set operates the engine at a first, low load condition at a lean air/fuel ratio using hydrogen fuel, and at a second, high load condition at a richer air/fuel ratio using gaseous fuel. The controller transitions from the first condition to the second condition by adding gaseous fuel to achieve the richer air/fuel ratio during a transient event.

20 Claims, 4 Drawing Sheets

TRANSIENT CONTROLLER AND METHOD OF OPERATING GAS ENGINE

TECHNICAL FIELD

This patent disclosure relates generally to internal combustion engines and, more particularly, to engines configured to operate using a gaseous fuel.

BACKGROUND

Internal combustion engines are used for various mobile applications, and also for stationary applications such as generator sets, engine-driven compressors, engine driven pumps, and others. While most applications might require a near constant load on the engine, the loading on an engine operating in a generator set may vary relatively quickly over time, especially when the electrical load on the generator varies.

In standby electric power applications, the standby generator set provides power quickly in response to an emergency, or to supplement electrical power provided by another power source such as a renewable power source. Natural gas fueled engines used to drive generators present advantages over diesel powered engines in that gas fueled engines do not require a large diesel tank onsite, generally have lower emissions than diesel engines, and are relatively more fuel efficient. Gas fueled engines, however, also have disadvantages over their diesel powered counterparts in that gas fueled engines are slow to respond during large load step increases, when the engine is required to ramp up to a required load demand within a certain time period. The slow transient response of gas fueled engines can be attributed, in large part, to larger turbochargers used in gas fueled engines having a high power density. When larger turbochargers are used, the rotational inertial of the turbine and compressor wheels, and also the larger frame size of the turbine and compressor, increase the functional moment of the engine when a fast increase in demanded load is required.

One solution proposed in the past for operating an engine using natural gas can be seen in U.S. Pat. No. 5,139,002, which describes using a blend of natural gas modified by hydrogen gas in predefined proportions to produce a mixture with a burn rate that matches the burn rate of gasoline. The mixture is provided for burning in a gasoline engine without the need for modifications in engine timing or other engine design parameters. While this system or method for using gas to operate an engine may work, it still requires a rather complex system of gas mixing and storage of mixtures onsite without appreciably improving the transient operation of the engine.

SUMMARY

In one aspect, the present disclosure describes an internal combustion engine that includes a cylinder block forming a cylinder, a gaseous fuel supply providing a gas selectively to the cylinder via a gas injector, a hydrogen fuel supply providing a hydrogen fuel selectively to the cylinder via a hydrogen fuel injector, a power output shaft arranged to receive a power output of the engine, the power output shaft mechanically connected with a piston disposed reciprocally in the cylinder, and a controller. The controller controls operation of the gas and hydrogen fuel injectors and is configured to operate the engine at a first condition in which the power output shaft transfers a first load, the first condition including a first air/fuel ratio in which a majority of fuel is hydrogen fuel, and at a second condition in which the power output shaft transfers a second load that is higher than the first load, the second condition including a second air/fuel ratio in which a majority of fuel is gaseous fuel. The controller is programmed to transition from the first condition to the second condition by adding gaseous fuel to achieve the second air/fuel ratio during a transient event in which the first load increases to the second load.

In another aspect, the present disclosure describes a controller for an internal combustion engine, the internal combustion engine having a cylinder block forming a cylinder, a gaseous fuel supply providing a gaseous fuel selectively to the cylinder via a gaseous fuel injector, a hydrogen fuel supply providing a hydrogen fuel selectively to the cylinder via a hydrogen fuel injector, a power output shaft arranged to receive a power output of the engine, the power output shaft mechanically connected with a piston disposed reciprocally in the cylinder. The controller is configured to, at times, operate the engine at a first condition in which the power output is low, wherein the first condition includes operating the engine at a first air/fuel ratio in which a majority of fuel provided to the cylinder is hydrogen fuel; transition from the first condition to a second condition in response to a step increase in load demand; and operate the engine at the second condition in which the power output is high, wherein the second condition includes operating the engine at a second air/fuel ratio in which a majority of fuel provided to the cylinder is gaseous fuel.

In yet another aspect, the present disclosure describes a method for operating an internal combustion engine. The method includes operating the engine at an initial state using primarily a hydrogen fuel at an initial air/fuel ratio that is lean, the initial state having an initial power output; determining that a transient event is present, the transient event requiring the engine to transition to a final power output, wherein the final power output is larger than the initial power output;

activating a transient controller upon determining that the transient event is present, the transient controller operating to: add a gaseous fuel to enrich the initial air/fuel ratio to a final air/fuel ratio; control an amount of the gaseous fuel added based on the final power output; and control an amount of the hydrogen fuel based on whether pre-ignition is present in at least one engine cylinder.

DETAILED DESCRIPTION

Figure 1:
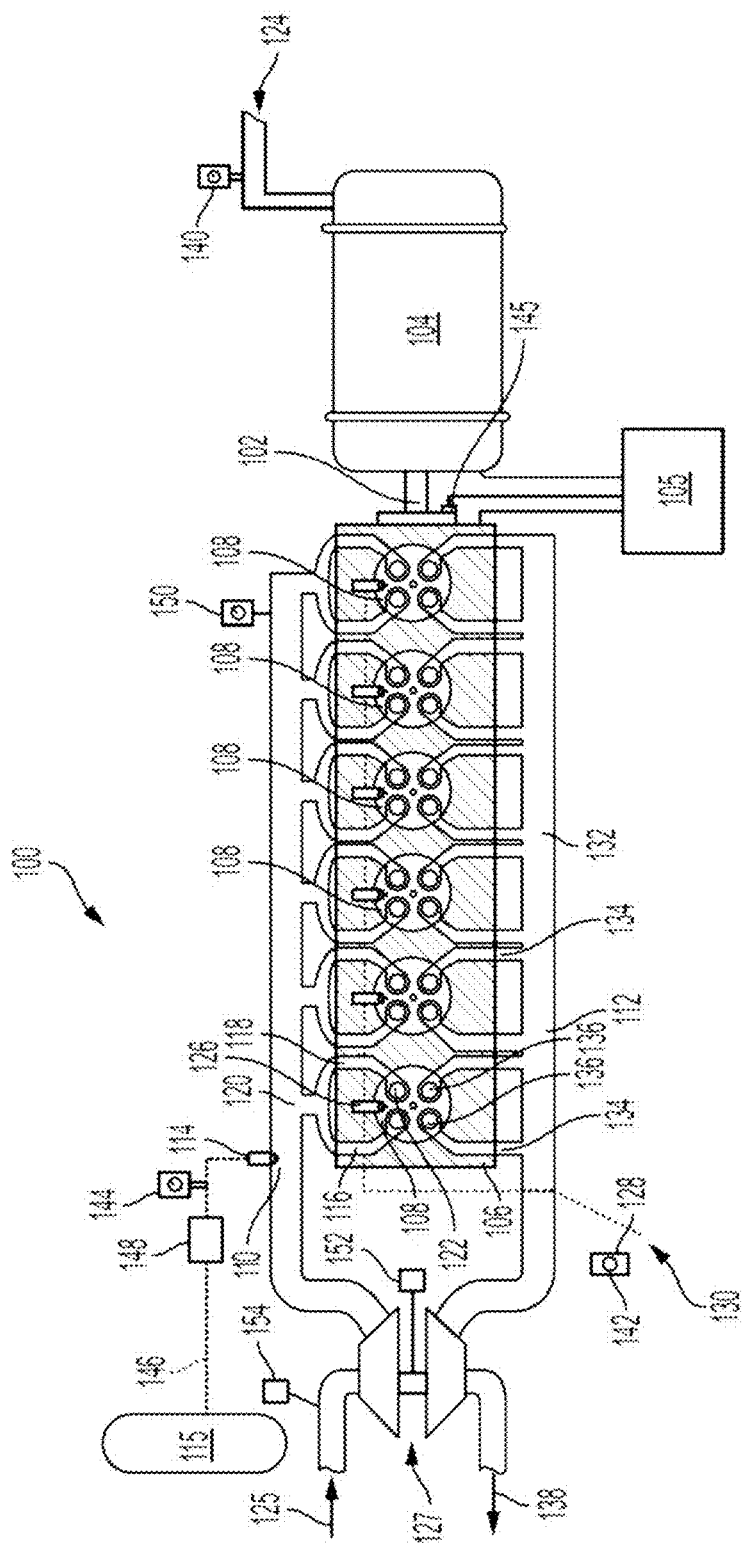
FIG. 1 is a block diagram of an internal combustion engine connected to a generator and configured to operate using two fuel supplies in accordance with the disclosure.

In a general aspect, the present disclosure is directed to a system and method for improving engine performance during transient events in a way that allows the engine to increase its load output quickly. Transient event, as used herein, is a change of engine operating parameters such as engine speed and/or load, from one operating state to another. Specifically in the context of electrical power generator sets, a transient event contemplated is engine operation in which a near constant (+/−10 RPM) engine speed is maintained, or recovered in a case of a speed droop, while an engine load changes, for example, is increased quickly during a short time period to meet a sudden electrical power demand increase. The systems and methods described herein are useful in helping the engine provide a maximum reasonable amount of power during a time period between an initial operating state of the engine, a final operating state of the engine, and during the transient event that lies therebetween.

In one embodiment, the system and method described herein lies in the time and manner in which the gaseous fuel provided to the engine is mixed with hydrogen. The term gaseous fuel, as used herein, is defined to include any type of combustible gas used as a fuel to operate the engine. For example, gaseous fuel can include natural gas, petroleum gas and other traditional gases, as well as premixed gasoline, landfill gas, biogas, mine gas, and others. Specifically, the air and fuel in a gas engine is typically premixed upstream of the turbocharger, and is then compressed before being routed or otherwise provided to the engine cylinders. This mixture is commonly referred to as the intake charge of the engine, which is a fuel and air mixture that is compressed, cooled, and throttled before being provided to the engine cylinders for burning. In the present embodiment, it is contemplated that the gaseous fuel is provided for mixing with air at any location, including upstream of an engine compressor, and also directly to an intake manifold of the engine and/or along one or more intake ports of the engine in a compressed state.

When the load on a gas engine is increased, addition of air to provide a more lean air/fuel mixture to the engine cylinders, which will also increase the total air flow through the engine that can increase turbocharger speed, will also reduce ignitability of the gaseous fuel, which can cause misfires. The present disclosure advantageously addresses the reduced ignitability of the gaseous fuel mixture in the cylinders, by providing to the cylinders a lean mixture of hydrogen and air with excess air to fuel (hydrogen) ratios of 2.5 to 4 during a "no load demand" situation. This level of excess air is more than twice than that of a normal lean burn natural gas engine. The increased flow rate of air can then be enriched with a gaseous fuel as soon as there is a load demand.

By adopting this initial condition, the fueling of gaseous fuel can be increased by more than twice as much than if it were running with gaseous fuel. Hydrogen can be supplemented as long as needed to improve engine loading without running into abnormal combustion. The benefit of running with excess air is that the throttle can be in its normal open operating position as opposed to having to open up to let air and fuel in to increase the load. The throttle will stay in its open position as it accepts more gaseous fuel and the engine load increases.

The transient response benefits can be improved with the use of pressurized hydrogen provided to, at times, operate the engine. The hydrogen can be provided at any location along an intake path of the engine, for example, upstream of an engine compressor as well as, in a pressurized state, directly to an intake manifold of the engine and/or along one or more intake ports of the engine cylinders. Gaseous fuel can then, at times, be provided to displace hydrogen gas when engine loading is increased. This gaseous fuel can be provided in relatively large amounts given the excess air already flowing through the engine while the engine operates on the hydrogen fuel. In combination with an engine speed sensor, when the control senses a speed droop, the hydrogen fueling can be increased to assist with load acceptance. Once the engine speed recovers, the hydrogen fueling can be cut off.

Depending on the location of the standby generator set, hydrogen can be produced onsite or bought and delivered to the site. For example, for a generator set that is located near a wind farm with hydrogen production, an electrolysis process may be used to separate hydrogen from water, and the generator set can be used to supplement or firm up power supply when the wind is not blowing. Alternatively, a reformer can be used to produce hydrogen from a hydrocarbon feedstock, for instance, the same gaseous fuel supply that is used to power the engine of the generator set. As an additional alternative, hydrogen may be delivered and stored in a reservoir associated with the engine.

An exemplary embodiment of the present invention will now be discussed in the context of a dual-fuel (gas and hydrogen) engine. FIG. 1 is a block diagram representation of an internal combustion engine 100 in accordance with the disclosure. As shown, the engine 100 is a stationary engine that is part of a generator set. Alternatively, the engine 100 may be part of a machine, marine vessel, off-highway truck, or the like, and be connected to an electrical generator that is part of a hybrid-electric drive system, a fluid pump that is part of a hydrostatic drive system, a transmission that is part of a machine propel system and the like. The engine 100 has an output shaft 102 connected to a generator 104. During operation, the engine 100 may operate at a nearly constant engine speed but at a varying load depending on the electrical power or current output of the generator 104. A controller 105 may be operably associated with various engine and/or generator systems. The controller 105 in the illustrated embodiment includes operable connections to various sensors and systems of the engine 100 and generator 104, and is configured to receive information on the operating parameters thereof as well as send commands to various actuators and systems through the connections.

The controller 105 may be a single controller or may include more than one controller disposed to control various functions and/or features of the system. For example, a master controller, used to control the overall operation and function of the generator set may be cooperatively implemented with an engine controller used to control the engine 100. In this embodiment, the term "controller" is meant to include one, two, or more controllers that may be associated with the engine 100 and that may cooperate in controlling various functions and operations of the engine 100 and generator 104. The functionality of the controller 105, while shown conceptually in FIGS. 2 and 3 to include various discrete functions for illustrative purposes only, may be implemented in hardware and/or software without regard to the discrete functionality shown. Accordingly, various interfaces of the controller are described relative to components of the generator set shown in the block diagram of FIG. 1. Such interfaces are not intended to limit the type and number of components that are connected, nor the number of controllers that are described.

Accordingly, the controller 105 in the illustrated embodiment is configured to receive information indicative of various operating parameters of the engine 100 and to control various operating parameters of the engine 100, such as fuel injection timing, allowable or desired fuel substitution rates depending on the operating point of the engine 100, intake manifold air pressure, turbocharger shaft speed, cylinder pressure, and others. The engine 100 may include various components and systems, such as lubrication and electrical systems, which have been omitted from FIG. 1 for simplicity. Relevant to the present disclosure, the engine 100 includes a cylinder case 106 having one or more combustion cylinders 108 formed therein. Although six cylinders 108 are shown in an inline configuration, any other number of cylinders arranged in different configurations, such as a "V" configuration, may be used.

Each cylinder 108 includes a reciprocable piston defining a combustion chamber that is connectable to an intake manifold 110 and an exhaust collector 112. Each cylinder 108 includes an injector 126, which can be used to provide gas directly into each cylinder 108, although it should be appreciated that one or more injectors 126 can alternatively be placed elsewhere on an air system of the engine such that gas is mixed with air before it is provided into the intake manifold 110. The injectors 126 are connected to a source of gaseous fuel such as natural gas, which provides fuel to each injector 126 via a gas line 128. Each injector 126 is configured to inject a predetermined amount of gas 130 into each cylinder 108 in response to an appropriate command from the controller 105 during engine operation. For example, the controller 105 may be configured to receive timing information from the engine 100, which is used to determine the appropriate injection timing for each combustion cylinder 108.

The engine 100 further includes a secondary fuel injector 114 disposed to inject a predetermined amount of hydrogen into the intake manifold 110. In the illustrated embodiment, for example, the secondary fuel injector 114 is operably connected to a hydrogen reservoir 115, which may be a tank reservoir or may alternatively be a pressure regulated supply from a field source. The hydrogen injector 114 operates to deliver a predetermined amount or stream of hydrogen into the intake manifold 110. The hydrogen delivered mixes with incoming air 125 to form an air/hydrogen mixture that is admitted into the cylinders 108 via intake valves 122. As previously discussed, the hydrogen injector 114 can be located upstream or downstream of the engine compressor.

At times, for example, during operation in a first condition or a no-load condition, a relatively lean mixture of air/hydrogen from the intake manifold 110, at an air/fuel ratio of around 2.5 to 4, is admitted into each cylinder 108 to fuel engine operation. The load produced by the engine during this condition is sufficient to overcome internal engine load, friction, and pumping losses and otherwise does not appreciably power the generator 104 to produce significant power. At times, for example, when an electrical load is applied to the generator 104, engine load must increase in response. During operation in a second condition, for example, a transient condition following a step increase in engine load from the first condition, gaseous fuel is injected or otherwise provided into each cylinder 108 through the gas injector(s) 126 at the appropriate time and duration during engine operation to provide a richer air/fuel mixture than what is already present in the cylinder 108. Compression of this mixture within the cylinder 108 produces a more stable combustion at a high engine load output, because sufficient air is present in the cylinders from operation in the first condition to support a relatively high fuel addition. Moreover, the excess air present in the first condition has already accelerated the turbocharger such that little to no lag is experienced by the engine.

In this respect, the engine 100 further includes one or more turbocharger(s) 127 (one shown) that is fluidly connected in the known configuration between the intake manifold and the exhaust collector 110 and 112. As engine operation transitions from the first to the second condition, the supply of hydrogen is reduced and the fueling is primarily accomplished by the gaseous fuel.

During operation in the first condition, air and hydrogen from the intake manifold 110 is provided to each cylinder 108 via, respectively, first and second intake ports 116 and 118. The first and second intake ports 116 and 118 of each cylinder 108 may be directly connected to an intake plenum volume 120 of the intake manifold 110 or may alternatively be branches of a combined intake port (not shown) that is fluidly open to the intake plenum volume 120. A first intake valve 122 is disposed to fluidly isolate the cylinder 108 from the first intake port 116, and a second intake valve 122 is similarly disposed to fluidly isolate the cylinder 108 from the second intake port 118. When the first and second intake valves 122 are closed, such as during combustion of the air/fuel mixture in the cylinder 108, fluid communication between each respective cylinder 108 and the intake manifold 110 is blocked. Similarly, at least partial opening of either the first and/or second intake valve(s) 122 permits the fluid communication of the cylinder 108 with the intake plenum volume 120 such that air 125 may enter the cylinder 108. The combustion of the air/fuel mixture in the cylinder 108 produces power, which is transferred as torque to the output shaft 102 to drive the generator 104. The generator 104 is configured to provide electrical power through an output node 124. Although two leads are shown in the output node 124, any other appropriate arrangement for electrical power production and distribution, such as multiphase outputs having more than two leads are contemplated.

Exhaust gas remaining after the combustion of fuel in the first or second condition, which can include fuel from the hydrogen injector 114 and/or the gas injector(s) 126 with air from the first and second intake ports 122 within each cylinder 108, is evacuated and collected in the exhaust collector 112. In the illustrated embodiment, each cylinder 108 is fluidly connectable to an exhaust plenum volume 132 via two exhaust ports 134. Each exhaust port 134 is fluidly isolatable from the cylinder 108 by a corresponding exhaust valve 136. The exhaust gas 138 collected is removed from the exhaust collector 112. Although two exhaust valves 136 are shown corresponding to each cylinder 108, a single exhaust valve disposed in a single exhaust port per cylinder 108 may be used.

The generator set that includes the engine 100 and generator 104 further includes various sensors that provide information to the controller 105 during operation. This information is processed by the controller 105 and used to generate commands and other signals for the various components and systems of the generator set.

In the illustrated, exemplary embodiment, the sensors include an electrical power sensor 140, which is generically illustrated in FIG. 1. The electrical power sensor 140 may provide an indication to the controller 105 of the electrical load or demand on the output node 124, for example, by monitoring voltage and/or current being provided by the generator 104. The sensor 140 is thus associated with the output node 124 and configured to measure a parameter indicative of an electrical power output of the generator 104 such as electrical voltage and/or current. In one embodiment, the electrical power provided by the generator is also an indication or is correlated to a power output that is or should be provided by the engine 100. Signals indicative of the electrical power measured by the sensor 140 are provided to the controller 105, which can then provide to the engine a load demand. A gas flow sensor 142 is associated with the gas line 128 and configured to measure one or more parameters indicative of a flow rate of gas that is provide to the injectors 126 during operation of the engine 100. Alternatively, a determination of the total fuel flow rate of gas may be carried out within the electronic controller 105 based on an aggregate of known gas injection amounts that are provided by each injection event. In one alternative embodiment, the basis for fuel delivery determination may be made on the basis of each engine stroke or each fuel injection event rather than in the aggregate. When the gas flow sensor 142 is used, the information or signals indicative of the flow rate of gas provided to the engine 100 is communicated either directly or indirectly to the controller 105. Additional sensors may be used, such as cylinder pressure, airflow, air pressure and/or oxygen concentration sensors (not shown) configured to measure parameters of the incoming airflow 125. In the illustrated embodiment, an engine speed sensor 145 is connected to the controller 105 and configured to provide a signal indicative of the speed of the engine, for example, as measured at the shaft 102.

A hydrogen flow sensor 144 is associated with a secondary fuel supply line 146 at a location downstream from a secondary fuel flow control valve 148. The control valve 148 may be operably associated with the controller 105 and configured to meter the flow of fuel from the reservoir 115 to the injector 114 in response to appropriate signals from the electronic controller 105. The secondary fuel flow sensor 144 may be located anywhere along the fuel line 146. In the illustrated embodiment, the fuel flow sensor 144 is located downstream of the control valve 148. The secondary fuel flow sensor 144 may be any appropriate type of digital or analog output sensor that is configured to provide a signal to the electronic controller 105 that is indicative of the mass flow or volume flow rate of hydrogen passing through the injector 114 during engine operation.

Additional sensors can also include an intake manifold air pressure (IMAP) 150, which provides to the controller 105 a signal indicative of the pressure of air or a mixture of air and gas within the intake plenum 120, a turbocharger shaft speed (TCS) sensor 152, which provides to the controller an indication of a rotating speed of the turbocharger shaft, and intake airflow (IAF) sensor 154, which provides to the controller 105 an indication of the airflow into the engine, and other sensors.

Figure 2:
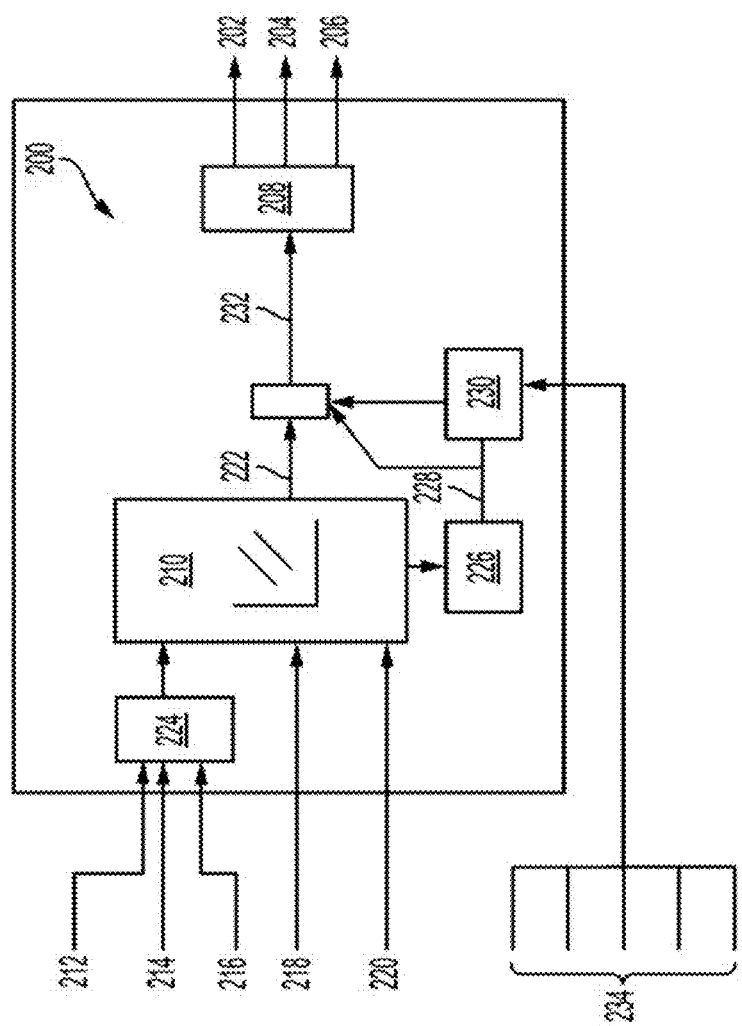
FIG. 2 is a graphical representation of a method for controlling engine fueling during a transient step change in load demand in accordance with the disclosure.

A block diagram for a controller 200 is shown in FIG. 2. The controller 200 may be a standalone controller or part of a larger control scheme for controlling and monitoring the operation of the generator set including the engine 100 and the generator 104 (FIG. 1). The controller 200 may be further integrated with and be operating within the electronic controller 105 (FIG. 1) such that inputs and outputs of the controller 200 are signals present within the electronic controller 105 that are implemented in hardware of software, for example, in the form of computer-executable instructions.

The controller 200 operates to provide a desired flow of hydrogen or gaseous fuel into the engine cylinders depending on an operating state of the engine. More specifically, the controller 200 receives various inputs and, based on those inputs, as will be hereinafter described, provides a desired hydrogen flow command 202, a desired gas command 204, and a desired throttle position command 206 during engine operation and based on a load demand from the generator. The commands 202, 204, and 206, are determined in a fueling state determinator 208, which includes various functionalities that are responsive to signals provided internally in the controller 200 and, specifically, signals that indicate whether a desired load level has been achieved while still maintaining engine speed within a desired or required range.

The controller 200 may operate in many different operating modes, but relevant to the present disclosure the controller 200 may operate in a first, steady state mode, and in a second, transient or high load mode. As used herein, steady state refers to an operating state of the engine in which changes in engine speed are generally small or sufficiently slow such that the engine is capable of performing relatively minor adjustments to its engine speed or load without exceeding the abilities of its various systems to track the change, and engine load variation or change is relatively low. Transient, on the other hand, refers to an operating state in which the engine is increasing its load level while maintaining engine speed within a desired range.

When operating in the steady state mode, the controller 200 may receive information indicative of the operating point of the engine with respect to an engine map 210. It should be appreciated that the engine map 210 may conceptually be considered as a two dimensional array of values that include a desired air/fuel ratio and engine output power, but in practice can be embodied as either an array or any other mathematical relation, including a machine learning model, neural network, and the like, which correlate two or more engine operating parameters to determine the operating state of an engine.

The engine map 210 receives input signals that indicate an operating state of the engine, including an engine speed signal 212, an intake pressure signal 214, an intake air flow signal 216, and/or other or different signals. In addition, a fueling signal 218, which can include fueling from hydrogen or gaseous fuel, and an engine load or power signal 220 are provided to the engine map 210, which determines based on this or other similar information an operating point of the engine, indicated generally as 222. In the embodiment shown, an intermediate module 224 may translate or otherwise transform sensor signals into engine parameters such as load to power, fueling and airflow to an air/fuel ratio, and the like. The operating point 222 is provided to the fueling state determinator 208 under stable or near-stable engine operation to control engine operation, as previously discussed, by providing an ultra-lean (2.5 to 4 air to fuel ratio) mixture of air and hydrogen to the engine cylinder.

The controller 200 further includes a transient determinator 226, which monitors the engine operating point determined by the engine map 210 or, alternatively, monitors key engine operating parameters such as engine speed or fueling commands requested, throttle setting, in-cylinder pressure, and the like, to determine when a transient event is imminent or underway. When a transient event is detected, the determinator 226 provides a transient enable signal 228 to a transient controller 230.

The transient controller 230 operates to intervene and adjust the desired or actual engine operating point 222 to produce an adjusted signal 232, which is then provided to the fueling state determinator 208. To aid in the explanation of the function of one embodiment of the transient controller 230, reference is made to the flowchart of FIG. 3.

Figure 3:
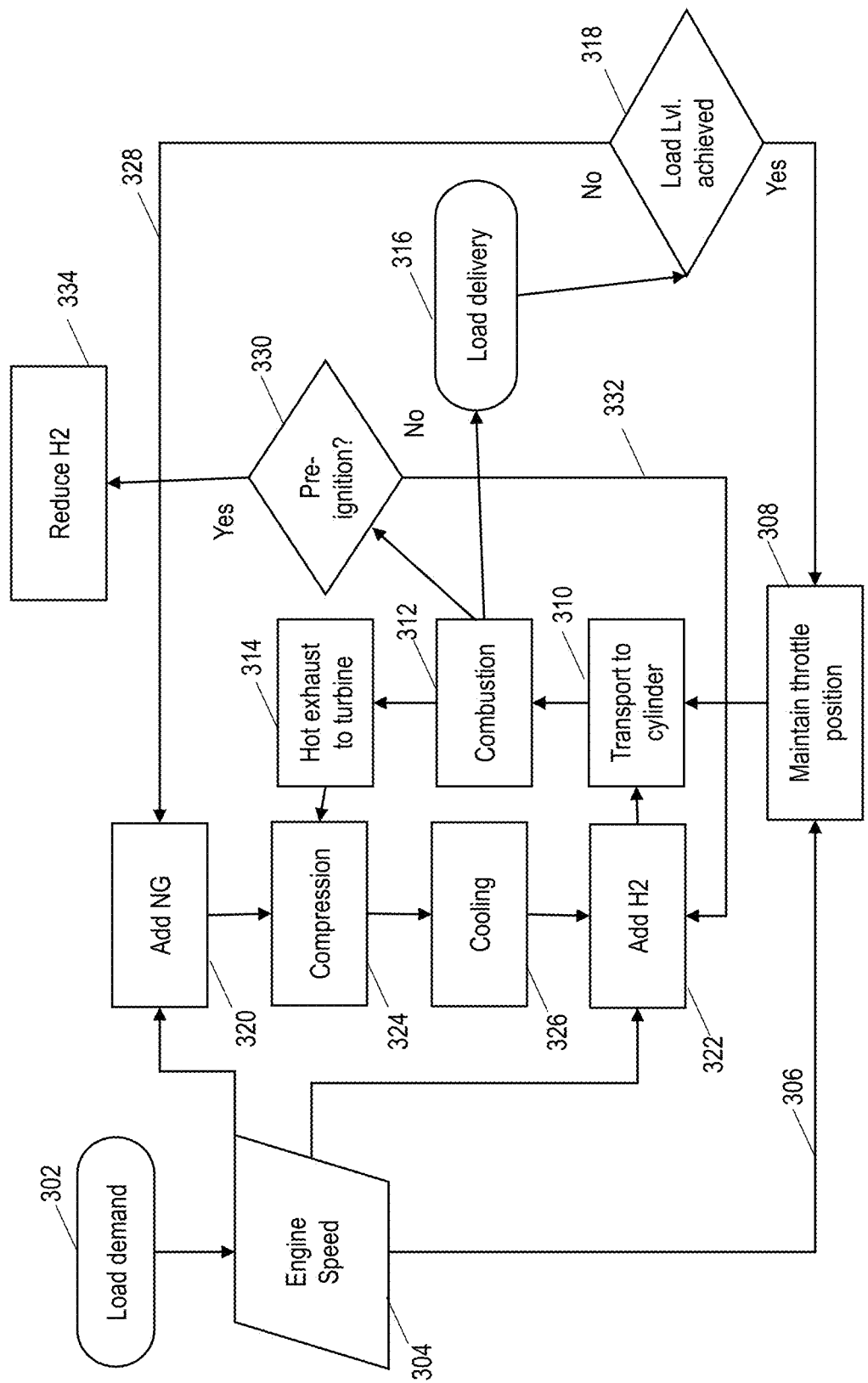
FIG. 3 flow diagram of an engine controller in accordance with the disclosure.

In reference to FIG. 3, a transient event may be manifested when a load demand 302 is provided, for example, in response to an increase in the generator electrical load. The load demand 302, especially when applied suddenly, and depending on its magnitude, may affect engine speed 304. If the magnitude of the load demand 302 is sufficiently low, or its application is sufficiently gradual, the engine speed 304 may not be affected substantially and remain within a desired range of a baseline engine speed, for example, within +/−10 revolutions per minute (RPM). In this case, denoted by line 306, a throttle position is maintained at 308 at the then existing fueling strategy, which may include hydrogen and/or gas provided to the cylinders.

In any event, throttle position at 308 determines the amount of intake charge delivered to the engine cylinders at 310, which combusts at 312 producing power and also hot exhaust gas that drives the turbine of the turbocharger at 314. The combustion power at 312 is directly proportional to the mechanical power provided by the engine as load delivery at 316, which load can be measured at 318 to determine whether the delivered load matches the desired load level, when the load is sufficient, the throttle position at 308 is maintained and the engine continues to operate as described above. In this condition, which be considered as a first condition, no fueling changes are made, the engine speed is assumed to be near-constant, and the engine delivers a desired load level. In other words, engine operation is presumed to be in a steady state.

However, insufficient load delivery, or drooping of the engine speed below a threshold, will cause a fueling change in a second operating condition, which can be described as a transient condition. In the transient condition, a reduction in engine speed or, stated differently, a load demand that is large enough or that is applied fast enough, may exceed the engine's ability to maintain its speed and require a fueling change. As shown in FIG. 3, a drooping condition will prompt an addition of gas into the cylinders at 320 and, simultaneously, an addition of hydrogen at 322. The gas may be compressed at 324, for example, in a compressor (or in the cylinder in a direct injection application), and cooled at 326, for example, in an after-cooler, before being mixed with the hydrogen gas, for example, in an intake manifold of the engine and transported to the cylinders at 310 for combustion at 312 and increased load delivery (due to the added gas and hydrogen).

When the increased load delivery at 316 is determined at 318 to be below the required load level, i.e. the load level has not yet been achieved, additional load ability is made possible with the introduction of more gas at 320, as denoted by arrow 328. At all times during operation, and also during a transient, the system performs a check for pre-ignition occurring in the cylinders at 330. The pre-ignition check at 330 may be carried out by monitoring cylinder pressure during combustion at 312. When there is no pre-ignition at 330, additional hydrogen may be added at 322 as denoted by arrow 332. When pre-ignition is present at 330 during combustion at 312, the amount of hydrogen may be reduced at 334. All increases and decreases of hydrogen at 322 or 334 may be carried out by adding or subtracting preset amounts or flow rates of hydrogen, which preset amounts may depend on the then-present operating state of the engine in terms of loading.

Returning now to FIG. 2, the transient controller 230 provides an adjustment signal 232, which is combined with various other engine inputs 234 provided from various sensors such as engine speed, engine load, cylinder pressure, air intake, fueling commands, and the like, to the fueling controller 208, which carries out the stepwise changes in engine operating points during a transient event that adjust the gas and hydrogen rates provided to the cylinders.

INDUSTRIAL APPLICABILITY

Figure 4:
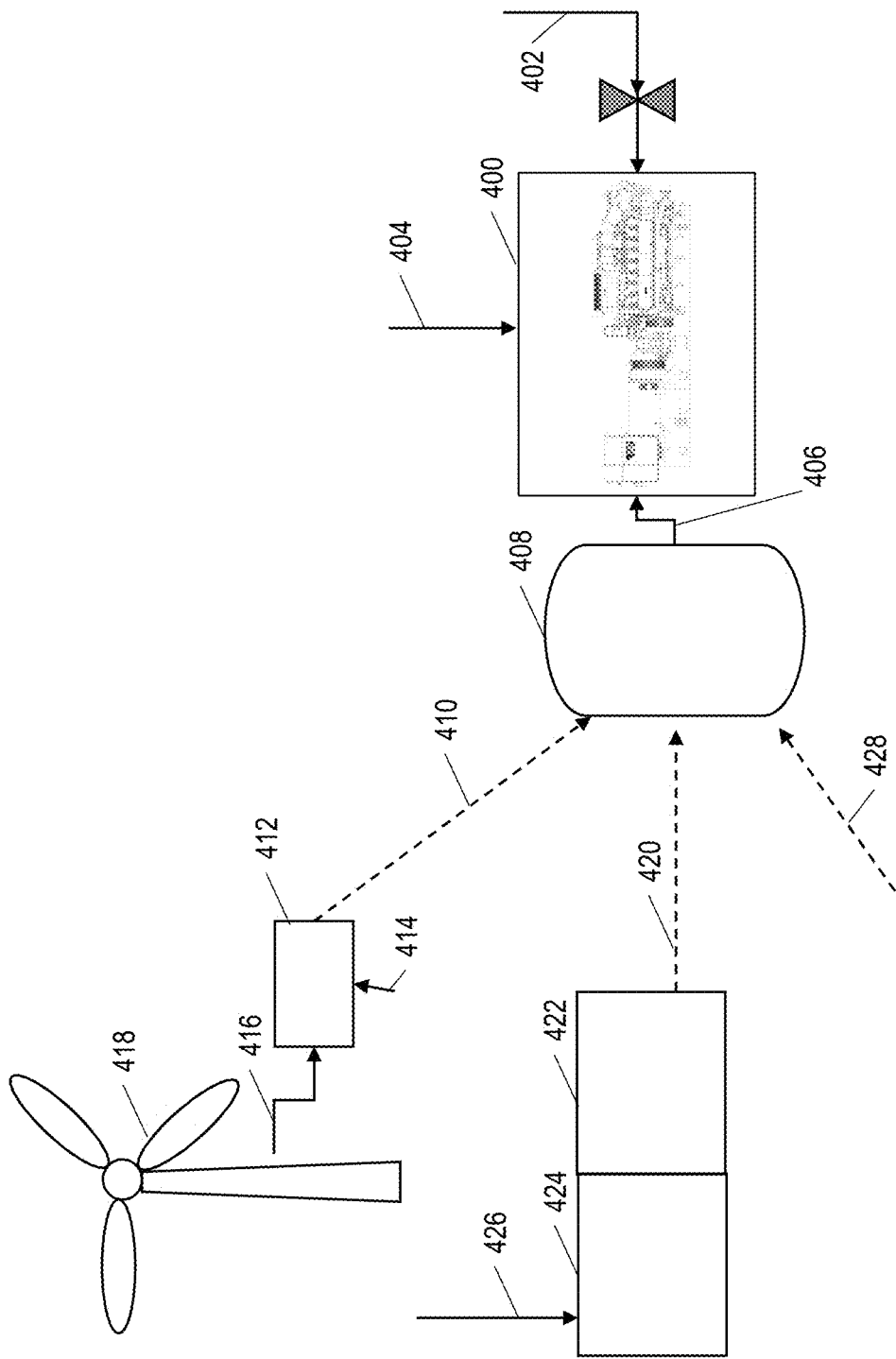
FIG. 4 is a schematic diagram for a system in accordance with the disclosure.

A schematic diagram showing various alternative embodiments for providing hydrogen to an engine that is part of a generator set is shown in FIG. 4. In this illustration, the generator set 400 receives a supply of gaseous fuel 402, air 404, and hydrogen fuel 406, which are used to operate the engine as previously described. The hydrogen fuel 406 is provided from a reservoir 408, which can be replenished in various ways. Three alternative replenishment systems and methods are shown. These include a supply 410 provided from an electrolyzer 412 operating to electrolyze water 414 using electrical power 416 provided by a renewable source such as a wind turbine 418, or alternatively a different source such as a solar array (not shown). This power may be directly drawn from the renewable source, a battery bank associated with the renewable source, and the like.

An alternative source of hydrogen 420 may be provided by a membrane separator that operates in conjunction with a reformer 424. The reformer 424 may reform a hydrocarbon source 426, such as the gaseous fuel 402 or another feedgas. As a third alternative source 428, hydrogen gas may be delivered directly to the storage tank 408 already formed and refined.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The invention claimed is:

1. An internal combustion engine, comprising:
   a cylinder block forming a cylinder;
   a gaseous fuel supply providing a gaseous fuel selectively to the cylinder via a gas injector;
   a hydrogen fuel supply providing a hydrogen fuel selectively to the cylinder via a hydrogen fuel injector;
   a power output shaft arranged to receive a power output of the engine, the power output shaft mechanically connected with a piston disposed reciprocally in the cylinder;
   a controller controlling operation of the gas and hydrogen fuel injectors, the controller configured to operate the engine at a baseline engine speed in a first condition in which the power output shaft transfers a first load, the first condition including a first air/fuel ratio in which a majority of fuel is hydrogen fuel and the cylinder is operating using an ultra-lean mixture of air and hydrogen, and at the baseline engine speed in a second condition in which the power output shaft transfers a second load that is higher than the first load, the second condition including a second air/fuel ratio in which a majority of fuel is gaseous fuel;
   wherein the controller is programmed to transition from the first condition to the second condition when the controller determines that a speed of the engine droops below the baseline engine speed by adding both additional gaseous fuel and additional hydrogen fuel to achieve the second air/fuel ratio during a transient event in which the first load increases to the second load, wherein the additional gaseous fuel is increased incrementally while the engine has not yet reached the second load, and wherein the additional hydrogen fuel is also increased incrementally until the controller detects pre-ignition to be occurring in the cylinder.

2. The internal combustion engine of claim 1, wherein the first air/fuel ratio is between 2.5 and 4.

3. The internal combustion engine of claim 1, further comprising an intake plenum and an exhaust collector fluidly connected with the cylinder, and a turbocharger connected across the intake plenum and the exhaust collector.

4. The internal combustion engine of claim 3, wherein the gaseous fuel is mixed with incoming air upstream of the turbocharger and delivered to the intake plenum.

5. The internal combustion engine of claim 3, wherein the hydrogen fuel is provided directly to the intake plenum.

6. The internal combustion engine of claim 1, wherein the controller operates to adjust an amount of gaseous fuel provided to the cylinder based on a magnitude of the second load.

7. The internal combustion engine of claim 1, wherein the controller further operates to determine whether the pre-ignition is occurring in the cylinder, and wherein the controller is further configured to cease increasing an amount of hydrogen fuel provided to the cylinder when pre-ignition is detected to be occurring in the cylinder.

8. The internal combustion engine of claim 7, wherein the controller is configured to increase the amount of hydrogen fuel while pre-ignition is not occurring, and to decrease the amount of hydrogen fuel when pre-ignition occurs.

9. A controller for an internal combustion engine, the internal combustion engine having a cylinder block forming a cylinder, a gaseous fuel supply providing a gaseous fuel selectively to the cylinder via a gaseous fuel injector, a hydrogen fuel supply providing a hydrogen fuel selectively to the cylinder via a hydrogen fuel injector, and a power output shaft arranged to receive a power output of the engine, the power output shaft mechanically connected with a piston disposed reciprocally in the cylinder, the controller is configured to:
at times, operate the engine at a baseline engine speed in a first condition in which the power output is low, wherein the first condition includes operating the engine at an ultra-lean first air/fuel ratio in which a majority of fuel provided to the cylinder is hydrogen fuel;
transition from the first condition to a second condition in response to a step increase in load demand while the engine continues to operate at the baseline engine speed, wherein the transition includes incrementally increasing the gaseous fuel supply to the cylinder and also incrementally increasing the hydrogen fuel supply to the cylinder; and
operate the engine at the second condition in which the power output is high, wherein the second condition includes operating the engine at a second air/fuel ratio in which a majority of fuel provided to the cylinder is gaseous fuel.

10. The controller of claim 9, wherein the first air/fuel ratio is between 2.5 and 4.

11. The controller of claim 9, wherein the engine further comprises an intake plenum and an exhaust collector fluidly connected with the cylinder, and a turbocharger connected across the intake plenum and the exhaust collector.

12. The controller of claim 11, wherein the controller is further configured to cause the gaseous fuel to mix with incoming air upstream of the turbocharger and delivering a mixture at the second air/fuel ratio to the intake plenum.

13. The controller of claim 11, wherein the controller is further configured to cause the hydrogen fuel to mix directly into the intake plenum.

14. The controller of claim 9, wherein the controller is further configured to adjust the second air/fuel ratio based on a magnitude of the load demand.

15. The controller of claim 9, wherein the controller is further configured to determine whether a pre-ignition is occurring in the cylinder, and cease an incremental increase of the hydrogen fuel supply to the cylinder based on presence of pre-ignition in the cylinder.

16. The controller of claim 15, wherein the controller is further configured to increase the amount of hydrogen fuel while pre-ignition is not occurring, and decrease the amount of hydrogen fuel when pre-ignition occurs.

17. A method for operating an internal combustion engine, the method comprising:
operating the engine at a baseline engine speed at an initial state using primarily a hydrogen fuel at an initial air/fuel ratio that is ultra-lean, the initial state having an initial power output;
determining that a transient event is present, the transient event requiring the engine to transition to a final power output while remaining at the baseline engine speed, wherein the final power output is larger than the initial power output;
activating a transient controller upon determining that the transient event is present, the transient controller operating to:
add a gaseous fuel to enrich the initial air/fuel ratio to a final air/fuel ratio;
control an amount of the gaseous fuel added based on the final power output; and
increase an amount of the hydrogen fuel based on whether pre-ignition is present in at least one engine cylinder.

18. The method of claim 17, wherein the initial air/fuel ratio is between 2.5 and 4.

19. The method of claim 17, wherein the transient controller adds gaseous fuel and hydrogen fuel simultaneously when an engine speed drops below a threshold.

20. The method of claim 17, wherein the transient controller increases an amount of hydrogen fuel while pre-ignition is not occurring, and decreases the amount of hydrogen fuel when pre-ignition occurs.

* * * * *